US008903191B2

(12) United States Patent  (10) Patent No.: US 8,903,191 B2
Nestares et al.  (45) Date of Patent:  Dec. 2, 2014

(54) METHOD AND APPARATUS FOR NOISE REDUCTION IN VIDEO

(75) Inventors: Oscar Nestares, San Jose, CA (US); Horst W. Haussecker, Palo Alto, CA (US); Scott M. Ettinger, San Carlos, CA (US); Yoram Gat, Palo Alto, CA (US); Sreenath Kurupati, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1025 days.

(21) Appl. No.: 12/317,806

(22) Filed: Dec. 30, 2008

(65) Prior Publication Data

US 2010/0165206 A1  Jul. 1, 2010

(51) Int. Cl.
*G06K 9/40* (2006.01)
*G06K 9/32* (2006.01)
*G06K 9/36* (2006.01)
*H04N 5/00* (2011.01)
*G06T 5/50* (2006.01)
*G06T 5/00* (2006.01)

(52) U.S. Cl.
CPC . *G06T 5/50* (2013.01); *G06T 5/002* (2013.01); *G06T 2207/20028* (2013.01); *G06T 2207/10016* (2013.01)
USPC .......... 382/275; 382/294; 382/284; 382/276; 382/254; 348/607; 348/E5.001

(58) Field of Classification Search
USPC .......... 348/607, E5.001; 382/284, 294, 275, 382/276, 254
See application file for complete search history.

(56) References Cited

U.S. PATENT DOCUMENTS

| | | | |
|---|---|---|---|
| 5,361,105 A | 11/1994 | Iu | |
| 5,453,792 A * | 9/1995 | Gifford et al. | 348/441 |
| 5,696,848 A | 12/1997 | Patti et al. | |
| 5,715,000 A * | 2/1998 | Inamori | 348/241 |
| 6,408,104 B1 * | 6/2002 | Lim et al. | 382/275 |
| 6,490,364 B2 * | 12/2002 | Hanna et al. | 382/107 |
| 6,798,897 B1 * | 9/2004 | Rosenberg | 382/107 |
| 7,519,235 B1 * | 4/2009 | Georgiev | 382/298 |
| 7,711,044 B1 * | 5/2010 | Hoang et al. | 375/240 |
| 7,945,117 B2 * | 5/2011 | Hermosillo Valadez et al. | 382/294 |

(Continued)

FOREIGN PATENT DOCUMENTS

CN  101009021 A  8/2007
EP  0614312 A2  9/1994

(Continued)

OTHER PUBLICATIONS

Korean Office Action, Application No. 10-2011-7007690, mailed Mar. 29, 2012, 4 pages of Korean Office Action with 2 pages of English translation.

(Continued)

*Primary Examiner* — Michelle Entezari
(74) *Attorney, Agent, or Firm* — Jordan IP Law, LLC

(57) ABSTRACT

In some embodiments, a method of processing a video sequence may include receiving an input video sequence having an input video sequence resolution, aligning images from the input video sequence, reducing noise in the aligned images, and producing an output video sequence from the reduced noise images, wherein the output video sequence has the same resolution as the input video sequence resolution. Other embodiments are disclosed and claimed.

20 Claims, 8 Drawing Sheets

(56) References Cited

U.S. PATENT DOCUMENTS

| | | | |
|---|---|---|---|
| 8,447,565 B2* | 5/2013 | Kallman | 702/182 |
| 8,478,555 B2* | 7/2013 | Gilmore et al. | 702/85 |
| 8,712,156 B2* | 4/2014 | Bronstein et al. | 382/181 |
| 2002/0135743 A1* | 9/2002 | Gindele | 355/18 |
| 2003/0095696 A1* | 5/2003 | Reeves et al. | 382/131 |
| 2003/0189655 A1* | 10/2003 | Lim et al. | 348/241 |
| 2004/0073111 A1 | 4/2004 | Poland et al. | |
| 2005/0093987 A1* | 5/2005 | Hatanaka et al. | 348/208.99 |
| 2005/0168651 A1* | 8/2005 | Morino | 348/700 |
| 2006/0008152 A1* | 1/2006 | Kumar et al. | 382/190 |
| 2006/0083440 A1* | 4/2006 | Chen | 382/284 |
| 2006/0257042 A1* | 11/2006 | Ofek et al. | 382/255 |
| 2008/0050043 A1* | 2/2008 | Hermosillo Valadez et al. | 382/294 |
| 2008/0226189 A1* | 9/2008 | Connell | 382/255 |
| 2009/0245755 A1* | 10/2009 | Lee et al. | 386/114 |
| 2009/0284601 A1* | 11/2009 | Eledath et al. | 348/157 |
| 2010/0034272 A1* | 2/2010 | Miyazaki et al. | 375/240.16 |
| 2011/0273621 A1* | 11/2011 | Richardson et al. | 348/608 |
| 2013/0129141 A1 | 5/2013 | Wang et al. | |

FOREIGN PATENT DOCUMENTS

| | | | | |
|---|---|---|---|---|
| EP | 1045591 | * | 10/2000 | H04N 7/26 |
| JP | 05-061975 A | | 3/1993 | |
| JP | 05-236302 A | | 9/1993 | |
| JP | 07-274044 A | | 10/1995 | |
| JP | 08-065682 A | | 3/1996 | |
| JP | 2002099176 A | | 4/2002 | |
| JP | 2004-289829 A | | 10/2004 | |
| JP | 2005-295287 A | | 10/2005 | |
| JP | 2005-295302 A | | 10/2005 | |
| JP | 2006-211254 A | | 8/2006 | |
| JP | 2006-221190 A | | 8/2006 | |
| JP | 2006-309749 A | | 11/2006 | |
| JP | 2006-319136 A | | 11/2006 | |
| JP | 2007-194979 A | | 8/2007 | |
| JP | 2007-299068 A | | 11/2007 | |
| JP | 2008-062035 A | | 3/2008 | |
| JP | 2008-294601 A | | 12/2008 | |
| WO | 2007103051 A3 | | 9/2007 | |
| WO | 2010/077913 A2 | | 8/2010 | |
| WO | 2010/077913 A3 | | 9/2010 | |

OTHER PUBLICATIONS

International Preliminary Report on Patentability, Application PCT/US2009/068185, mailed Jul. 14, 2011.

International Search Report and Written Opinion, Application PCT/US2009/068185, mailed Jul. 8, 2010.

Office Action received for Chinese Patent Application No. 200980139835.2, mailed on Feb. 5, 2013, 12 pages of Office Action including 6 pages of English translation.

Office Action received for Japanese Patent Appliaction No. 2011-544464, mailed on Feb. 26, 2013, 4 pages of Office Action including 2 pages of English translation.

Office Action received for Chinese Patent Application No. 200980139835.2, mailed on Oct. 11, 2013, 8 pages of Office Action including 5 pages of English Translation.

Office Action received for United Kingdom Patent Application No. 1105549.8, mailed on Aug. 13, 2013, 3 pages.

Notice of Allowance received for Chinese Patent Application No. 200980139835.2, mailed on Apr. 25, 2014, 2 pages of English Translation and 2 pages of Chinese Office Action.

* cited by examiner

METHOD AND APPARATUS FOR NOISE REDUCTION IN VIDEO

The invention relates to video processing. More particularly, some embodiments of the invention relate to noise reduction in video.

BACKGROUND AND RELATED ART

U.S. Pat. No. 7,447,382 describes computing a higher resolution image from multiple lower resolution images using model-based, robust Bayesian estimation. A result higher resolution (HR) image of a scene given multiple, observed lower resolution (LR) images of the scene is computed using a Bayesian estimation image reconstruction methodology. The methodology yields the result HR image based on a likelihood probability function that implements a model for the formation of LR images in the presence of noise. This noise is modeled by a probabilistic, non-Gaussian, robust function.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
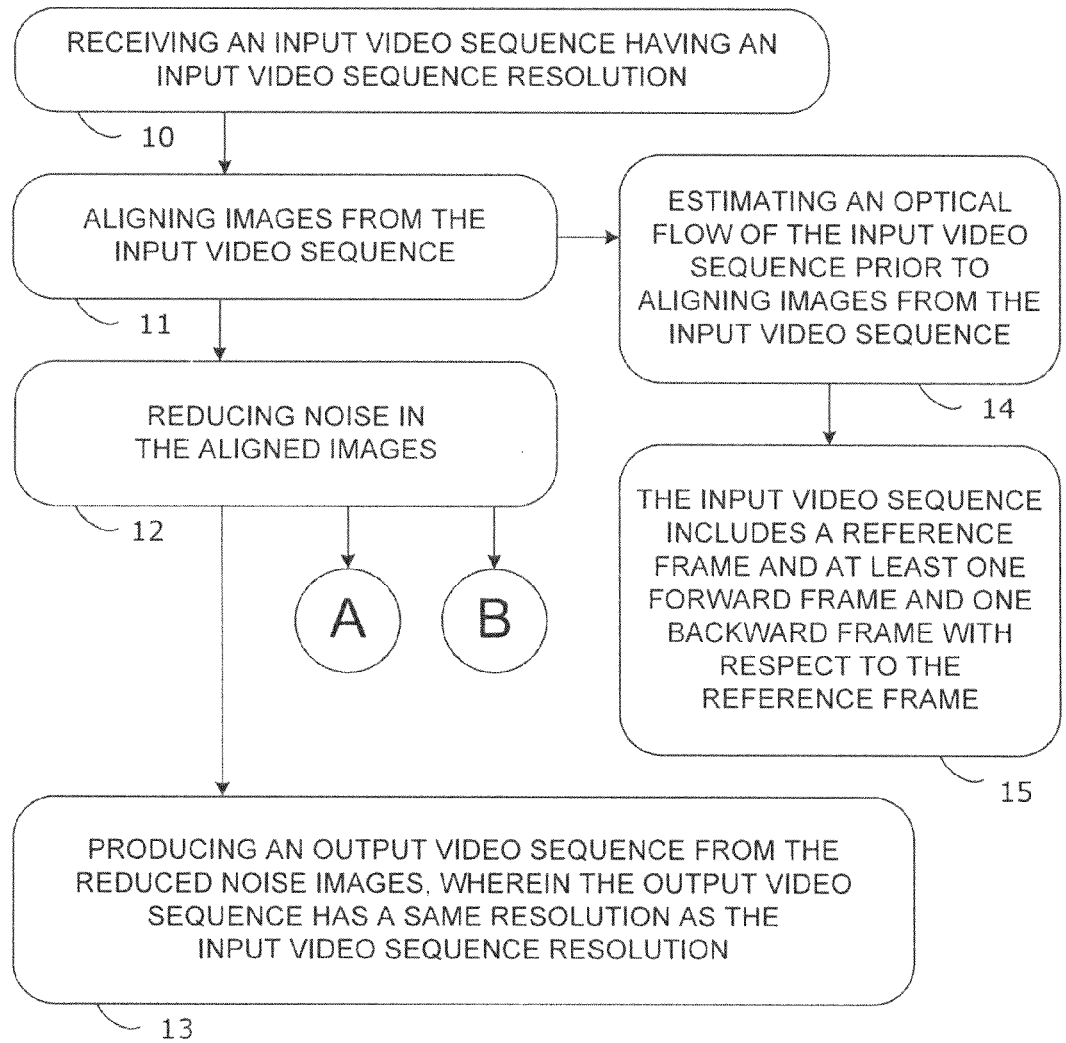
FIG. 1 is a flow diagram in accordance with some embodiments of the invention.

With reference to FIG. 1, a method of processing a video sequence in accordance with some embodiments of the invention may include receiving an input video sequence having an input video sequence resolution (e.g. at block 10), aligning images from the input video sequence (e.g. at block 11), reducing noise in the aligned images (e.g. at block 12), and producing an output video sequence from the reduced noise images, wherein the output video sequence has a same resolution as the input video sequence resolution (e.g. at block 13). For example, prior to aligning images from the input video sequence may further require estimating an optical flow of the input video sequence prior to aligning images from the input video sequence (e.g. at block 14). For example, the input video sequence may include a reference frame and at least one forward frame and at least one backward frame with respect to the reference frame (e.g. at block 15).

Figure 2:
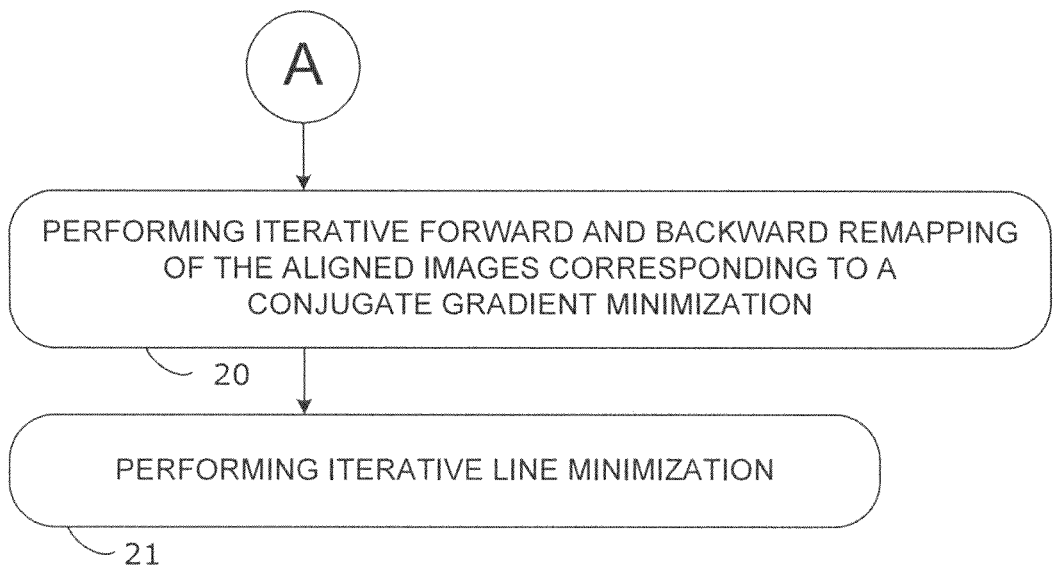
FIG. 2 is another flow diagram in accordance with some embodiments of the invention.

With reference to FIG. 2, in some embodiments of the invention reducing noise in the aligned images may include performing iterative forward and backward remapping of the aligned images corresponding to a conjugate gradient minimization (e.g. at block 20). In some embodiments of the invention reducing noise in the aligned images may include performing iterative line minimization (e.g. at block 21).

Figure 3:
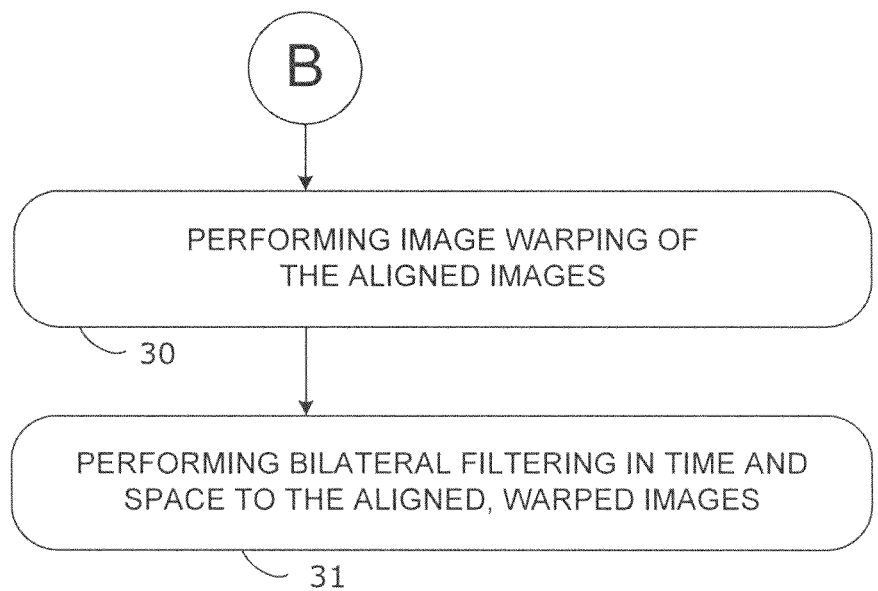
FIG. 3 is another flow diagram in accordance with some embodiments of the invention.

With reference to FIG. 3, in some embodiments of the invention reducing noise in the aligned images may include performing image warping of the aligned images. In some embodiments of the invention reducing noise in the aligned images may include performing bilateral filtering in time and space to the aligned, warped images.

Figure 4:
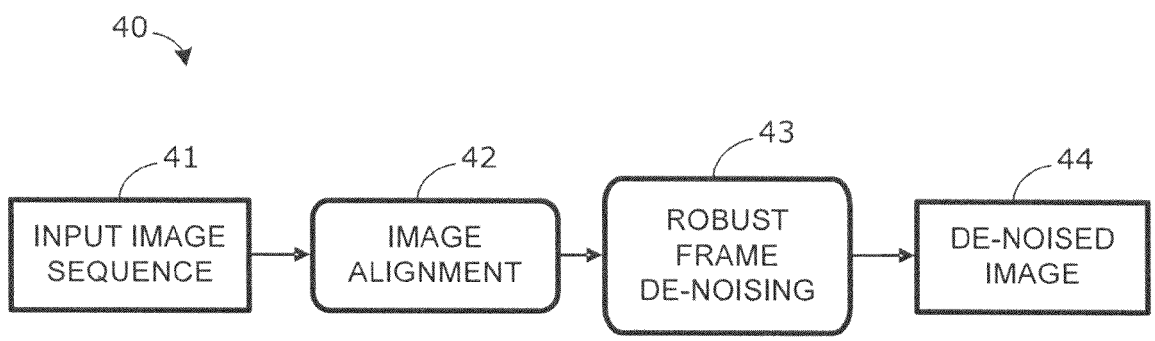
FIG. 4 is a block diagram of a video processing apparatus in accordance with some embodiments of the invention.

With reference to FIG. 4, a video processing apparatus 40 in accordance with some embodiments of the invention may include a first module 41 to receive an input video sequence having an input video sequence resolution, a second module 42 coupled to the first module 41 to align images from the input video sequence, a third module 43 coupled to the second module 42 to reduce noise in the input video sequence based on the aligned images, and a fourth module 44 coupled to the third module 43 to produce an output video sequence based on the reduced noise input video sequence, wherein the output video sequence has no greater resolution than the input video sequence resolution.

Figure 5:
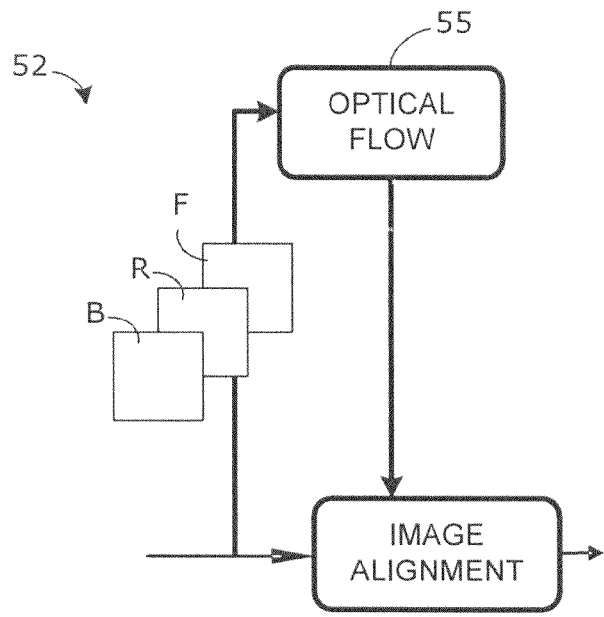
FIG. 5 is a block diagram of another video processing apparatus in accordance with some embodiments of the invention.

With reference to FIG. 5, an image alignment module 52 (e.g. the second module 42 from FIG. 4) may further include a module 55 to estimate an optical flow of the input video sequence. For example, the input video sequence may include a reference frame R and at least one forward frame F and at least one backward frame B with respect to the reference frame R.

Figure 6:
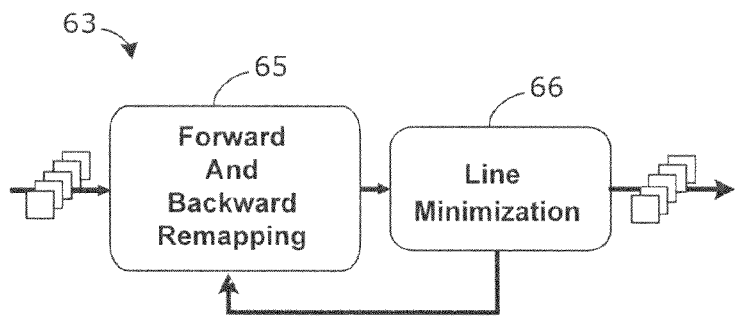
FIG. 6 is a block diagram of a de-noising module in accordance with some embodiments of the invention.

With reference to FIG. 6, a de-noising module 63 (e.g. the third module 43 from FIG. 4) may include a module 65 to perform iterative forward and backward remapping of the aligned images corresponding to a conjugate gradient minimization. The de-noising module 63 may further include a module 66 to perform iterative line minimization.

Figure 7:
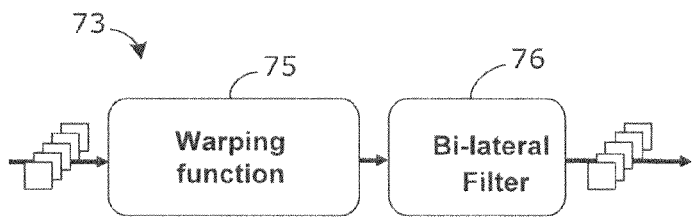
FIG. 7 is a block diagram of another de-noising module in accordance with some embodiments of the invention.

With reference to FIG. 7, an alternative de-noising module 73 (e.g. the third module 43 from FIG. 4) may include a module 75 to perform image warping of the aligned images. The alternative de-noising module 73 may further include a module 76 to perform bilateral filtering in space and time to the aligned, warped images.

Figure 8:
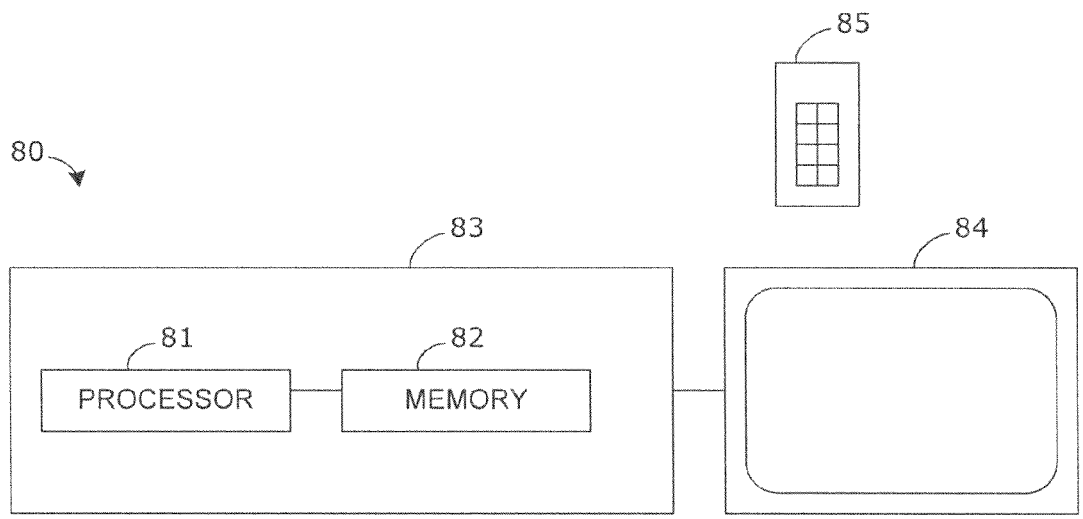
FIG. 8 is a block diagram of a processor-based electronic system in accordance with some embodiments of the invention.

With reference to FIG. 8, a processor-based electronic system 80 may include a processor 81 and a memory 82 coupled to the processor 81. For example, the memory 82 may have instructions that, when executed by the processor, receive an input video sequence having an input video sequence resolution, align images from the input video sequence, reduce noise in the input video sequence based on the aligned images, and produce an output video sequence based on the reduced noise input video sequence, wherein the output video sequence has no greater resolution than the input video sequence resolution. For example, the memory 82 may have further instructions that when executed by the processor estimate an optical flow of the input video sequence. For example, the input video sequence may include a reference frame and at least one forward frame and at least one backward frame with respect to the reference frame.

For example, the memory 82 may have further instructions that when executed by the processor perform iterative forward and backward remapping of the aligned images corresponding to a conjugate gradient minimization. The memory 82 may have further instructions that when executed by the processor perform iterative line minimization. Alternatively, the memory 82 may have further instructions that when executed by the processor perform image warping of the aligned images and perform bilateral filtering in time and space to the aligned, warped images.

For example, the processor 81 and memory 82 may be disposed in a housing 83. For example, the housing may correspond to any of desktop computer, a laptop computer, a set-top box, a hand-held device, among numerous other possibilities for the processor-based system 80. For example, system 80 may further include a display device 84 coupled to the processor 81 and memory 82. The output video sequence may be displayed on the display device 84. For example, the system 80 may further include an input device 85 to provide user input to the processor 81 and 82. For example, the input device 85 may be a wireless remote control device.

Advantageously, some embodiments of the invention may reduce noise in video and/or image sequences. Without being limited to theory of operation, some embodiments of the invention may provide optical flow based robust multi-frame noise reduction in video. For example, some embodiments of the invention may be applied to videos and/or image sequences from a variety of different sources, quality and acquisition methods, including consumer grade videos acquired with inexpensive devices (like the ubiquitous cellphone cameras, webcams, etc.), professional grade videos acquired in non-optimal conditions (low illumination), medical image sequences from various sources (X-ray, ultrasound, etc.), among numerous other sources of video sequences.

Without being limited to theory of operation, some embodiments of the invention may exploit the high degree of redundancy usually present in videos and image sequences. For example, in the case of a noisy video sequence of a static scene and camera many samples of frames of the noisy intensity at each pixel can be used to obtain a statistical estimate of the underlying constant intensity of that pixel (e.g. by taking the average of all the samples available).

In many video sequences, however, the scenes are usually not static due to camera or object motion. Advantageously, some embodiments of the invention may estimate the optical flow of the video sequence. For example, the optical flow may correspond to the apparent motion of the intensity levels from one image to the next in the sequence due to the motion of the camera or the objects in the scene. For example, the optical flow may be estimated from a window of frames around a reference frame (e.g. a nominal central frame), taking for example two frames forward and two frames backward to use a total of five frames, and aligning each frame to the reference frame.

For example, the image alignment can be estimated using different motion models, ranging from low parameter motion models (e.g., pure translation, rotation, affine, projective, etc.) that have limited applicability in general video, to dense non-parametric models (e.g., optical flow) in which a displacement vector is estimated for every pixel, with intermediate solutions being also possible (one low parameter motion model plus individual optical flow for points considered outliers for this model). For example, U.S. Patent Publication No. 2008-0112630, entitled DIGITAL VIDEO STABILIZATION BASED ON ROBUST DOMINANT MOTION ESTIMATION, describes that an apparatus may receive an input image sequence and estimate dominant motion between neighboring images in the image sequence. The apparatus may use a robust estimator to automatically detect and discount outliers corresponding to independently moving objects.

Some embodiments of the invention may utilize a gradient based, multi-resolution, optical flow estimation with theoretical sub-pixel accuracy. However, other methods for dense motion estimation are potentially applicable. For example, motion estimation techniques applied to frame rate conversion may be applicable.

Figure 9:
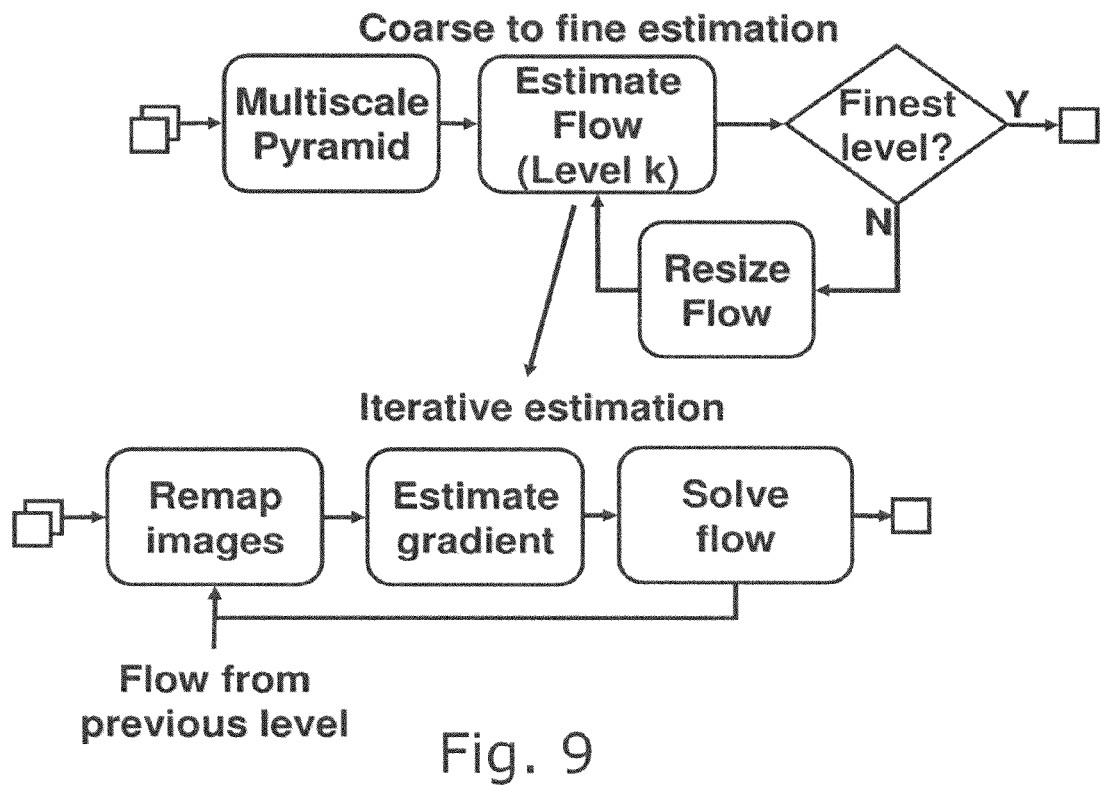
FIG. 9 is a block diagram of an optical flow estimation module in accordance with some embodiments of the invention.

With reference to FIG. 9, some embodiments of the invention may include an optical flow estimation which uses a gradient based coarse to fine estimation. For example, once a multi-resolution pyramid is obtained the optical flow may be estimated at each resolution level using as additional input the flow estimated from the previous level if available. At each level the optical flow is estimated iteratively by first remapping the input images according to the current estimate of the optical flow and then computing the second order gradient and solving for the flow vector at each pixel using gradient constraints from a neighborhood of the pixel itself.

In accordance with some embodiments of the invention, robust frame de-noising may be applied to the aligned images in the video sequence. For example, once the alignment has been estimated, the noisy intensities coming from different frames that correspond to the same scene location may be combined to obtain a de-noised version of the central, reference frame. In accordance with some embodiments of the invention, a range of robustness may be applied to the frame de-noising. For example, in some embodiments of the invention the robust frame de-noising may involve relatively high computational cost and provide very effective de-noising (e.g. a Bayesian method). For example, in some embodiments of the invention the robust frame de-noising may involve a relatively lower computational cost but provide less effective de-noising (e.g. based on pre-warping).

One important parameter in robust methods (like the ones proposed here) is what is known as a scale parameter which is related to what magnitudes of the error are considered noise and what magnitudes are considered outliers. This important parameter is automatically estimated from the input images using a robust estimate of the image noise (based on the MAD—median of absolute differences—of the vertical and horizontal pixel differences). This allows the proposed methods to work in a completely automatic mode without user interaction independent of the noise level of the input image sequence.

Figure 10:
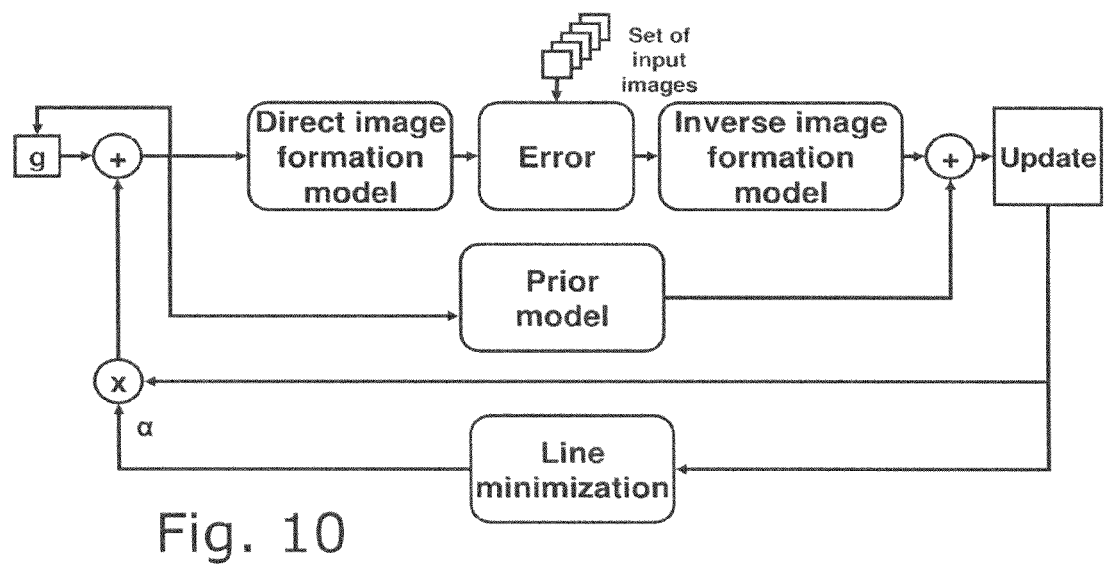
FIG. 10 is a block diagram of another de-noising module in accordance with some embodiments of the invention.

With reference to FIG. 10, an example Bayesian method may be based on using a direct image formation model from the noise-free image to the corresponding measured frame, that includes the warping needed to align the images and additive noise. It may also include a prior model on the noise-free image which is a compact probabilistic description of what we expect to see in natural images. For example, the method may use non-linear conjugent gradient to minimize the cost function given by the Bayesian model. Given a current estimate of the noise-free image g, two updates are computed using the image formation model (involving backward remapping, computing the error, applying a non-linear function, and forward remapping) and the prior model. Once the updates are computed, an optimal weighting factor α is estimated using a line minimization, and the update is multiplied by this weight and added to the estimate of the noise-free image g, to obtain a new current estimate of g. The procedure may then be iterated until convergence.

Advantageously, as compared to the super-resolution image processing described in the above-mentioned U.S. Pat. No. 7,447,382, some embodiments of the invention may involve a relatively lower computational cost while still providing good de-noising performance. For example, because some embodiments of the present invention do not increase the resolution of the image, the image formation model may omit down/up sampling. Some embodiments of the invention may be iterative and utilize the application of the direct and inverse image formation models (basically backward and forward remapping) multiple times, as well as to do a line minimization at each iteration, resulting in an high computational cost. Advantageously, the results of this iterative model-based method are usually very high quality with high noise reduction and virtually no additional blur introduced in the resulting images. In some embodiments of the invention additional de-blurring capabilities may be utilized.

In accordance with some embodiments of the invention, a lower computational cost method may be based on pre-warping the images and then combining the results. For example, once the alignment has been estimated, it is possible to combine the noisy intensities coming from different frames that correspond to the same scene location in a statistical way to obtain a de-noised version of the central frame. For example, warping may be performed on every image in the window of images around the central frame using the estimated optical flow. The warping may be done using backwards interpolation (e.g. using bi-linear interpolation).

After the surrounding images have been aligned to the central frame and warped, the result is a collection of frames whose pixels are aligned, providing each frame at least one noisy sample of the underlying noise-free intensity. For example, at every pixel position there are a number of noisy intensity samples ranging from 1 (the one corresponding to the central frame) to the number of images depending on the visibility of that pixel in the different images. In accordance with some embodiments of the invention, all of the available samples may then be combined using an approach similar to bilateral filtering.

For example, a weighted average for each pixel position may be determined, where the weights of each sample are a function of the difference in intensities between the sample and the central frame (e.g. using a Gaussian function). Advantageously, some embodiments of the invention may favor intensities that are close to the intensity value of the central frame, which may avoid combining wrong intensities coming from incorrect alignments. Advantageously, the computational cost of this method is relatively low as it doesn't require iterations and the process is done locally on a pixel by pixel basis.

Advantageously, some embodiments of the invention may provide a multi-frame de-noising method for video that is a relatively simple (e.g. as compared to the Bayesian method), without resolution increase, and having relatively low computational cost. Once the frames to be combined are aligned, some embodiments of the invention may involve very little additional bandwidth and operations. Advantageously, some embodiments of the invention may utilize the motion already estimated by other modules (e.g. one used for frame rate conversion) to perform the image alignment, resulting in further computational savings (e.g. and potentially silicon area or board area savings for hardware implementations).

Some embodiments of the invention may include robust de-noising using bilateral filtering. Once the images are aligned, the intensity values may be combined on a pixel by pixel basis to estimate a value of the noise-free intensity underlying the noisy measurements using an appropriate statistical method. For example, a straightforward method for combining the measurements may be to take a simple statistical estimator, such as the average or the median. However, these estimators may not be sufficiently robust to errors in the alignment. Gross errors in the alignment may occur, even using advanced motion estimation techniques. Advantageously, some embodiments of the invention may combine the noisy measurements based on bilateral filtering, which may improve the results even when there are alignment errors.

Bilateral filtering may be useful for spatial de-noising based on obtaining at each pixel a weighted average of the intensities of the pixels in a surrounding window (e.g. similar to a linear filtering), where the weight at a given pixel is a function of the difference between the intensity at that pixel and the intensity at the central frame (e.g., a Gaussian, which will give more weight to intensities close to the central pixel).

Some embodiments of the invention may combine the intensities coming from different frames, which results in the following solution for a given image (the individual pixel locations are omitted from the equation for clarity):

$$O = \frac{\sum_{k=1}^{N} W_0(I_c - I_k) \cdot I_k}{\sum_{k=1}^{N} W_0(I_c - I_k)} \quad (1)$$

where N is the number of frames being combined, c is the index corresponding to the central (reference) frame, and where the images $I_k$ are already warped according to the estimated alignment to the central frame.

Some embodiments of the invention may combine both temporal and spatial information, such that to obtain the value of one given pixel, information may be combined from the same location in multiple pre-aligned frames, together with neighboring pixels in a window surrounding the given pixel in the central frame.

Without being limited to theory of operation, the bilateral filter can be interpreted as one iteration of the method of iteratively re-weighted least squares estimator, with a solution initialized with the intensity of the central pixel. Advantageously, some embodiments of the invention may be non-iterative, robust to outliers, and produce a de-noised pixel value that is close to the original value of the central pixel. This may be particularly advantageous when a gross alignment error may otherwise bias the estimate of the intensity to values very far from the original value, even using robust estimators, when the breakdown point of the robust estimator is reached, and creating artifacts.

In iterative RWLS this procedure may be iterated until convergence is achieved. In accordance with some embodiments of the invention, bilateral filtering in Eq. 1 provides a result which is a reasonable estimate of the RWLS method. For example, one particular noisy measurement may be defined as the central value, used as an initial estimate of g, and then a result may be computed with just one iteration. Therefore, in some embodiments of the invention bilateral filtering can be interpreted as running one iteration of an iterative RWLS with a particular starting point.

In standard bilateral filtering the most common choice for the weighting function is a Gaussian weighting function, which corresponds to an underlying robust function known as the Welsch function in the robust statistics literature. Other choices of robust functions may be suitable alternatives for the bilateral filter. For example, the Cauchy function may be appropriate for video de-noising as it may provide high quality results in super-resolution applications. The Huber function may also provide good results. On the contrary, the Tukey function, with a shape similar to the Welsch function, may be suitable but not as good.

Figure 11:
FIG. 11 is a reference digital image.
Figure 12:
FIG. 12 is a processed digital image in accordance with some embodiments of the invention.
Figure 13:
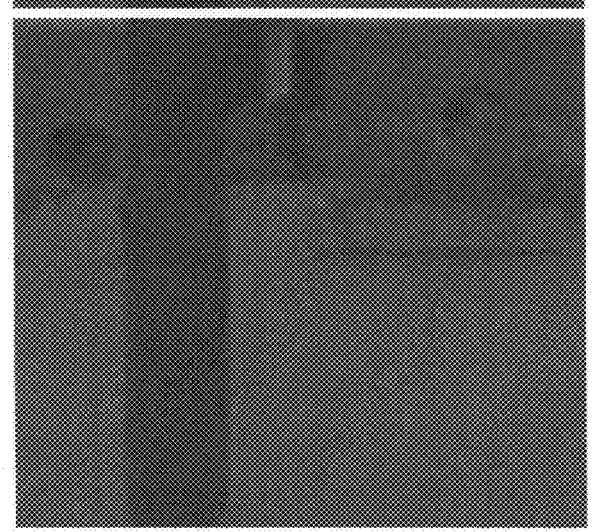
FIG. 13 is another processed digital image in accordance with some embodiments of the invention.
Figure 14:
FIG. 14 is another reference digital image.
Figure 15:
FIG. 15 is another processed digital image in accordance with some embodiments of the invention.
Figure 16:
FIG. 16 is another processed digital image in accordance with some embodiments of the invention.
Figure 17:
FIG. 17 is another reference digital image.
Figure 18:
FIG. 18 is another processed digital image in accordance with some embodiments of the invention.
Figure 19:
FIG. 19 is another processed digital image in accordance with some embodiments of the invention.

With reference to FIGS. 11-19, results of this de-noising method are shown in several test images. FIG. 11 is a crop (e.g. a sub-region) of a HD professional quality sequence with a moderate level of noise. FIG. 12 is a representative digital image after Bayesian de-noising in accordance with some embodiments of the invention. FIG. 13 is a representative digital image after temporal bilateral de-noising in accordance with some embodiments of the invention. FIG. 14 is digital image from a home video acquired in low light and with high level of noise. FIG. 15 is a representative digital image after Bayesian de-noising in accordance with some embodiments of the invention. FIG. 16 is a representative digital image after temporal bilateral de-noising in accordance with some embodiments of the invention. FIGS. 17-19 correspond to FIGS. 14-16 enlarged to show detail.

The results of FIGS. 13, 16, and 19 were obtained using only temporal combination (Eq. 1) of 5 frames, and using a Gaussian weighting function where the standard deviation of the Gaussian has been estimated as 2.5 times a robust estimate of the image noise (based on the MAD—median of absolute differences—of the vertical and horizontal pixel differences). In a preliminary evaluation the results obtained from this method appear to be lower quality (slightly noisier and blurrier) than the ones obtained with the higher computational cost iterative Bayesian. Advantageously, however, both methods are observed to produce images with manifest lower noise than the original. The higher computational cost Bayesian reconstruction is observed to better preserve the sharpness than the bilateral filtering approach.

Advantageously, some embodiments of the invention combine motion estimation with robust statistical methods (like bilateral filtering or Bayesian reconstruction with robust functions) to achieve a high quality de-noising, substantially artifact free and that does not introduce substantial spatial blur. Furthermore, the method may be made fully automatic and can be applied to sequences with different levels of noise, from not noisy to very noisy, without introducing noticeable artifacts or decrease in visual quality in the noise free sequences.

For example, some embodiments of the invention may be useful in video processing pipelines to be incorporated in displays and/or set-top boxes which may benefit from a de-noising module to clean potentially noisy content. For example, some embodiments of the invention may be implemented as fixed function hardware. For example, some embodiments of the invention may be implemented as a software solution running on special purpose or general purpose processors. Although described in connection with modules, those skilled in the art will appreciate that such modules are not necessarily discrete parts with fixed components. Rather such modules may be implemented by various combinations of hardware and/or software distributed throughout the architecture of a processor-based system.

Those skilled in the art will appreciate that the flow diagram of FIGS. 1-3 and the block diagrams of FIGS. 4-10 may be implemented in any of a number of arrangements of hardware, software, and/or firmware. For example, the diagrams may be completely implemented by special purpose hardware circuits. Alternatively, the diagrams may be completely implemented by software running on a general purpose processor. Alternatively, the diagrams may be selectively partitioned between special purpose hardware and software running on a general purpose processor.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A method of processing a video sequence, comprising:
   receiving an input video sequence having an input video sequence resolution;
   aligning images from the input video sequence;
   reducing noise in the aligned images including performing iterative forward and backward remapping of the aligned images corresponding to a conjugate gradient minimization; and
   producing an output video sequence from the reduced noise images, wherein the output video sequence has a same resolution as the input-video sequence resolution, wherein a scaling parameter estimated from the input video sequence utilizing an estimate of image noise based on median of absolute differences of vertical and horizontal pixel differences is used in reducing the noise.

2. The method of claim 1, wherein aligning images from the input video sequence further comprises:
   estimating an optical flow of the input video sequence prior to aligning images from the input video sequence.

3. The method of claim 2, wherein the input video sequence includes a reference frame and at least one forward frame and at least one backward frame with respect to the reference frame.

4. The method of claim 1, wherein reducing noise in the aligned images includes:
   performing iterative line minimization.

5. The method of claim 1, wherein reducing noise in the aligned images includes:

performing image warping of each of the aligned images to a reference frame, wherein intensity values of the aligned images are combined to obtain a de-noised version of the reference frame.

6. The method of claim 5, wherein reducing noise in the aligned images includes:

performing bilateral filtering in time and space to the aligned, warped images to combine the intensity values.

7. A non-transitory computer readable media including program instructions which when executed by a processor cause the processor to:

receive an input video sequence having an input video sequence resolution;

align images from the input video sequence;

reduce noise in the input video sequence based on the aligned images including a performance of iterative forward and backward remapping of the aligned images corresponding to a conjugate gradient minimization; and produce an output video sequence based on the reduced noise input video sequence, wherein the output video sequence has no greater resolution than the input video sequence resolution, wherein a scaling parameter estimated from the input video sequence utilizing an estimate of image noise based on median of absolute differences of vertical and horizontal pixel differences is used in reducing the noise.

8. The non-transitory medium of claim 7, the medium having further instructions that when executed by the processor estimate an optical flow of the input video sequence.

9. The non-transitory medium of claim 8, wherein the input video sequence includes a reference frame and at least one forward frame and at least one backward frame with respect to the reference frame.

10. The non-transitory medium of claim 7, the medium having further instructions that when executed by the processor perform iterative line minimization.

11. The non-transitory medium of claim 7, the medium having further instructions that when executed by the processor perform image warping of each of the aligned images to a reference frame, wherein intensity values of the aligned images are combined to obtain a de-noised version of the reference frame.

12. The non-transitory medium of claim 11, the medium having further instructions that when executed by the processor perform bilateral filtering to the aligned, warped images to combine the intensity values.

13. A processor-based electronic system, comprising:

a processor;

a memory coupled to the processor, the memory having instructions that, when executed by the processor, receive an input video sequence having an input video sequence resolution;

align images from the input video sequence;

reduce noise in the input video sequence based on the aligned images including a performance of iterative forward and backward remapping of the aligned images corresponding to a conjugate gradient minimization; and produce an output video sequence based on the reduced noise input video sequence, wherein the output video sequence has no greater resolution than the input video sequence resolution, wherein a scaling parameter estimated from the input video sequence utilizing an estimate of image noise based on median of absolute differences of vertical and horizontal pixel differences is used in reducing the noise.

14. The processor-based electronic system of claim 13, the memory having further instructions that when executed by the processor estimate an optical flow of the input video sequence.

15. The processor-based electronic system of claim 14, wherein the input video sequence includes a reference frame and at least one forward frame and at least one backward frame with respect to the reference frame.

16. The processor-based electronic system of claim 13, the memory having further instructions that when executed by the processor perform iterative line minimization.

17. The processor-based electronic system of claim 13, the memory having further instructions that when executed by the processor perform image warping of each of the aligned images to a reference frame, wherein intensity values of the aligned images are combined to obtain a de-noised version of the reference frame.

18. The processor-based electronic system of claim 17, the memory having further instructions that when executed by the processor perform bilateral filtering to the aligned, warped images to combine the intensity values.

19. The method of claim 1, further including using an image formation model including the iterative forward and backward remapping of the aligned images corresponding to the conjugate gradient minimization and a prior model including a probabilistic description to reduce noise in the aligned images.

20. The method of claim 5, further including determining a weighted average of the intensity values, wherein a weight at a pixel is to be based on a difference between an intensity value of the pixel and an intensity value of a pixel at the reference frame.

* * * * *